[12] United States Patent  
Mukul et al.

(10) Patent No.: US 12,135,741 B2
(45) Date of Patent: Nov. 5, 2024

(54) MARKOV DECISION PROCESS FOR EFFICIENT DATA TRANSFER

(71) Applicant: Adobe Inc., San Jose, CA (US)

(72) Inventors: Reetesh Mukul, Bangalore (IN); Mayuri Jain, Bangalore (IN)

(73) Assignee: Adobe Inc., San Jose, CA (US)

( * ) Notice: Subject to any disclaimer, the term of this patent is extended or adjusted under 35 U.S.C. 154(b) by 1133 days.

(21) Appl. No.: 16/943,331

(22) Filed: Jul. 30, 2020

(65) Prior Publication Data

US 2022/0035855 A1    Feb. 3, 2022

(51) Int. Cl.
*G06N 20/00*    (2019.01)
*G06F 16/58*    (2019.01)

(52) U.S. Cl.
CPC .............. *G06F 16/58* (2019.01); *G06N 20/00* (2019.01)

(58) Field of Classification Search
CPC .......... G06N 20/00; G06N 3/006; G06N 5/01; G06N 7/01; G06F 16/58; G06F 16/1858; G06F 16/2379
See application file for complete search history.

(56) References Cited

U.S. PATENT DOCUMENTS

2019/0238708 A1*   8/2019   Kozlovsky ............... G06F 16/93
2021/0374523 A1*  12/2021   Gottin .................... G06N 3/088
2022/0083884 A1*   3/2022   Chia ...................... G16H 50/20

OTHER PUBLICATIONS

Otterlo, "Reinforcement Learning and Markov Decision Processes", Springer, 2012. (Year: 2012).*
Ksentini, "A Markov Decision Process-based Service Migration Procedure for Follow Me Cloud", IEEE ICC 2014—Communication QoS, Reliability and Modeling Symposium. (Year: 2014).*
Anedda, "A Novel Markov Decision Process-Based Solution for Improved Quality Prioritized Video Delivery", IEEE Transactions on Network and Service Management, vol. 17, No. 1, Mar. 2020. Date of publication Dec. 2, 2019. (Year: 2019).*
Wang, "Dynamic Service Migration in Mobile Edge Computing Based on Markov Decision Process", IEEE/ACM Transactions on Networking, vol. 27, No. 3, Jun. 2019. Date of publication May 31, 2019. (Year: 2019).*

* cited by examiner

*Primary Examiner* — Dave Misir
(74) *Attorney, Agent, or Firm* — Finch & Maloney PLLC

(57) ABSTRACT

Techniques are disclosed for improving transfer speed for a plurality of files (e.g., image files) by using a Markov decision process to determine an optimal number of parallel instances of transfer stages and optimal file batch sizes for each instance. The transfer (e.g., import or export) operation involves different stages that are each optimized using the algorithm. The stages include a file fetch operation, a file processing operation, and a database update operation. Each of the stages may have multiple parallel instances to process many files at the same time. The Markov decision process uses a reward structure to determine the optimal number of parallel instances for each stage and the number of files operated on at each instance at any given moment in time. The process is dynamic and adaptable to any system environment since it does not rely on any particular hardware or operating system configuration.

20 Claims, 9 Drawing Sheets

400

MARKOV DECISION PROCESS FOR EFFICIENT DATA TRANSFER

FIELD OF THE DISCLOSURE

This disclosure relates generally to the field of data transfer, and more particularly, to techniques for improving the speed of batch-based transfers of a large number of files, such as when importing or exporting images.

BACKGROUND

Photography applications are invariably resource draining in nature. For instance, professional photographers often have complex and resource-intensive workflows, which then tend to impact the application responsiveness due to poor-tardy scheduling of tasks of the user workflows. Even for non-professionals, application features such as face detection or culling tend to be resource intensive. So, typical photography workflows like importing and exporting an image, image editing, and batch processing involving workflow on multiple images, are resource and time intensive operations. For many users of these applications it is highly desirable that underlying software uses system resources effectively while keeping time optimality as one of the foremost important criteria. For many such users it is a waste of time to wait for the import of images that may not be good shots and will be ultimately rejected in the future. In such cases, it would be helpful, for instance, if users could start working on their images as soon as the import process starts. But image importing takes a significant amount of time and is thus considered by many photographers as an overhead in photography applications. When represented in terms of software procedures, importing (or exporting) of image files or other files often involves pieces of code which are interdependent, and which have varying complexities (time or spacewise). For instance, the complexity of these tasks may arise from whether the tasks can be interdependent for a given file or across files, and also whether the tasks can be relatively prioritized or can be run together to reduce time on single core or multicore systems. Therefore, complex and non-trivial issues associated with file transfers, such as image importing operations, remain.

SUMMARY

Techniques are provided for improving the transfer speed of a plurality of files, such as with respect to the importation of image files into an image editing application. The techniques are particularly well-suited for efficiently managing multiple parallel operations related to a data transfer. For instance, in the context of image file importation, the multiple parallel operations may include parallel fetch operations, parallel image processing operations, and a database update operation, thereby providing multiple possible pathways through which the image files can be processed. A transfer manager intelligently directs the image importation process in real-time and selects the best pathway through the various available operational nodes for a given portion (batch) of image files being transferred. In one such example embodiment, a methodology includes initiating at a time $t_n$ a fetch operation on a batch of images having batch size of $m_F$, wherein the fetch operation is one fetch operation of $K_F$ fetch operations occurring in parallel with one another. The method further includes initiating at the time $t_n$ an image processing operation on a batch of images having batch size of $m_P$, wherein the image processing operation is one image processing operation of $K_P$ image processing operations occurring in parallel with one another. The method also includes initiating at the time $t_n$ a database update operation $K_D$ on a batch of images having batch size of $m_D$. The method uses a Markov decision process as the transfer manager, to determine values of $K_F$, $K_P$, $m_F$, $m_P$, and $m_D$ for time $t_n$ that results in a higher reward compared to a previous time $t_{n-1}$. The higher reward is associated with a lower import time for the plurality of image files. Any number of such use cases or applications involving a multi-operation file transfer process will be appreciated in light of this disclosure, and the present disclosure is not intended to be limited to the importation of image files. Rather, the techniques can be used on any number of file types that can be, for example, edited individually (processing operation), transferred in batches (fetch operation), and stored (database update operation), as will be appreciated.

Any number of non-transitory machine-readable mediums (e.g., embedded memory, on-chip memory, read only memory, random access memory, solid state drives, and any other physical storage mediums) can be used to encode the instructions that, when executed by one or more processors, cause the techniques provided herein to be carried out. Likewise, the techniques can be implemented in hardware (e.g., logic circuits such as field programmable gate array, purpose-built semiconductor, microcontroller with a number of input/output ports and embedded routines). Numerous embodiments will be apparent in light of this disclosure.

BRIEF DESCRIPTION OF THE DRAWINGS

The accompanying drawings are not intended to be drawn to scale.

DETAILED DESCRIPTION

Figure 1:
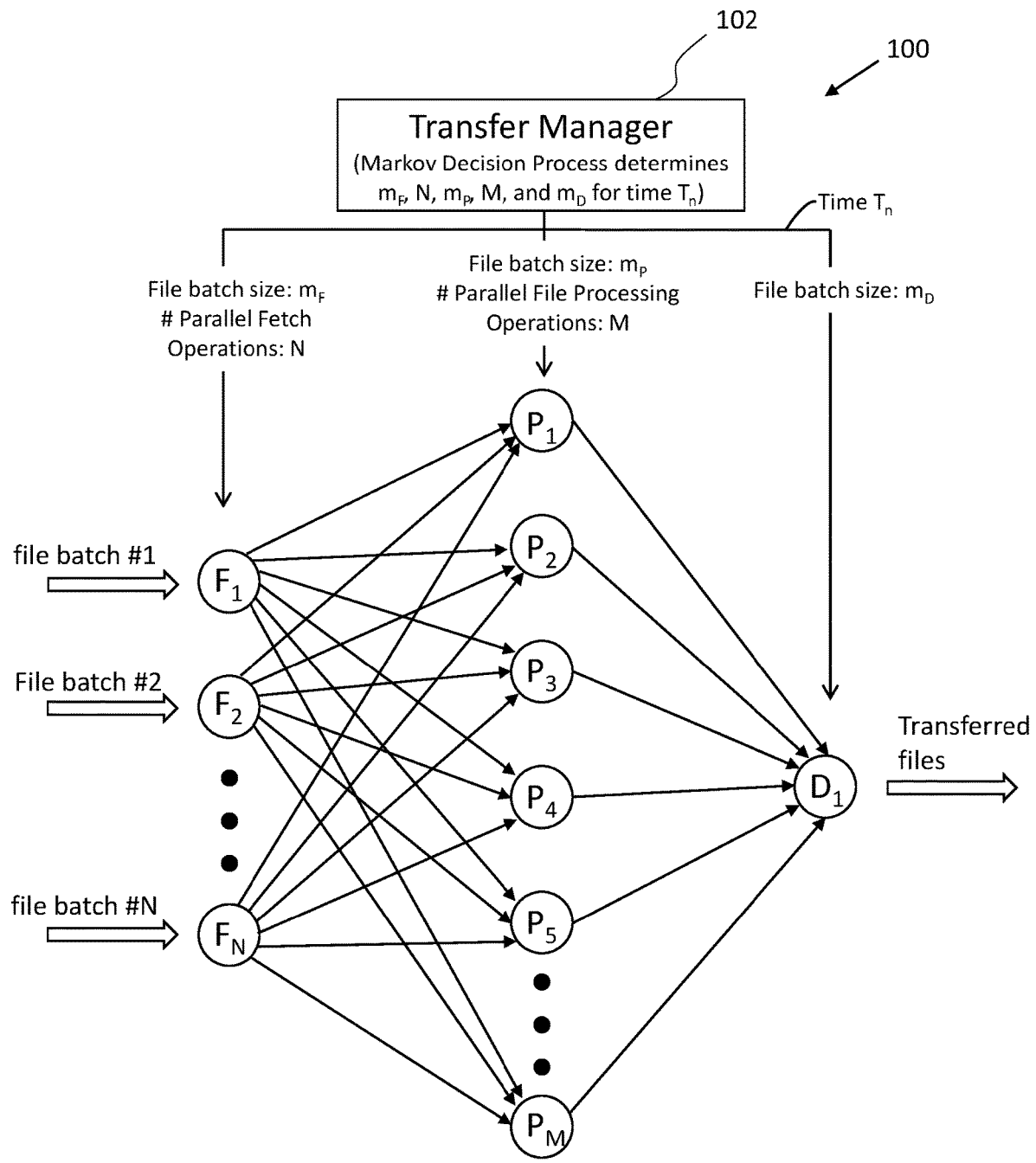
FIG. 1 is a diagram showing parallel instances of different stages of a managed data transfer operation, in accordance with some embodiments of the present disclosure.

Techniques are disclosed for improving the transfer speed for a plurality of files by using a Markov decision process to determine an optimal number of parallel instances of transfer stages and optimal file batch sizes for each instance using a reward system. The techniques are particularly well-suited for improving the import speed for a plurality of image files, where the Markov decision process is used to determine an optimal number of parallel instances of import stages and optimal image batch sizes for each instance. The reward system promotes faster processing actions or pathways and demotes slower processing actions or pathways. Thus, there is a degree of intelligence that is integrated into the parallel processing of importation process (or other file transfer process). As will be discussed in turn, the techniques provided herein target application delays to improve the latency of that application. In particular, and according to some embodiments, the techniques effectively learn from the given image editing application and schedule different subtasks of a given image processing operation (e.g., invocation of one or more commands based on metadata), and run those subtasks in such a way to obtain the maximum or otherwise improved throughput, thereby reducing completion time of the overall task. While the techniques are described in the context of image importation operations, they can be applied in other batch operations as well, such as image exportation. Numerous variations and embodiments will be appreciated in light of this disclosure.

General Overview

As noted above, users of photography applications often have complex and resource-intensive workflows, which then tend to impact the application responsiveness due to poor-tardy scheduling of tasks of the user workflows. File import is one workflow that is used by nearly all photography application users even before applying any presets or developing any edits. Import is universal across all photographic applications (though its name may be different), and sometimes it is localized to a system, or its execution is shared among the local system or cloud. Considering that import is a unique feature across all photography applications, and the principals involved in its processing can be shared across other batch processes, there is immense value to be added by streamlining the file import process. Unfortunately, there remain no solutions for streamlining such processes. While multicore systems can provide parallelism to keep time optimality in perspective, parallelism alone (without any intelligence) remains insufficient in the context of image importation. Thus, learning-based scheduling would be helpful to achieve performance. But how to implement that intelligence is not a trivial undertaking, which explains the lack of solutions and long felt need. For instance, one might consider using the schedular of an operating system, but an operating system tends to be unaware of local situations unique to a given application or is otherwise too generic. To this end, one may conclude that adding intelligence to the image importation process is best left to the application itself. However, this places a lot of onus on the application, and since there are so many variabilities across systems (or even on a single system), this quickly becomes complex. In order to optimally use system resources, the operational nature of tasks (e.g., interdependencies and task latencies, durations, resource requirements) would need to be estimated. Unfortunately, these details are typically absent for a given application, which causes further operational delays.

In contrast, an embodiment of the present application provides a learning-based task scheduling solution that targets the application delays and significantly improves the latency of the application. As will be further explained in turn, the methodology uses a Markov decision process to learn from the application, schedule different subtasks of a given operation (e.g., import, export), and execute those tasks in such a way so as to get the maximum or otherwise higher throughput and reduce overall operation time. The coefficients of the Markov decision process are initially tuned offline or otherwise in advance, and after that evolve through the given operation. The methodology is universal in nature and thus provides a generic intelligence for applications marred by task scheduling done by the operating system. This disclosure focuses primarily on using the Markov decision process to improve import latency for image files. However, as will be appreciated, the process may apply to any other application processes that involves movement or analysis of multiple data files. For example, embodiments of the present application may be used to improve data transfer rates for video processing, large scale PDF harvesting, or web page indexing.

According to some embodiments, the Markov decision process (herein referred to as the MDP) is used to smartly predict the optimal batch size and image groupings, and then processes the images on multiple cores in a parallel manner to reduce the import latency of the images. The import operation involves different stages that are each optimized using the MDP. In one such embodiment, the stages include an image fetch operation, an image processing operation, and a database update operation. Each of the stages may have multiple parallel instances to process many image files at the same time. The MDP uses a reward structure to determine the optimal number of parallel instances for each stage and the number of images operated on at each instance at any given moment in time. The process is dynamic and adaptable to any system environment since it does not rely on any particular hardware or operating system configuration. Additionally, the import optimization policy devised by the MDP updates itself at regular intervals and the updated policies are stored on the system in a persistent way so that they can be used across import sessions.

The ability for the MDP to dynamically update its import process to adapt to any import environment allows it to be used across any platform, according to some embodiments. Some factors that can change for a given import environment that affect the overall import time include image type, image size, image complexity, import source, and import destination. In some embodiments, the updated policies are stored on the system in a persistent way in order to be used again across other import sessions. The dynamic nature of the MDP can be observed in its ability to reduce the import time across various modes of import such as, for example, import from NAS, import from external memory cards, import from smartphones, etc. The MDP can even adapt to fluctuations in network speed when importing, for example, from NAS since it does not rely on predefined variables, but rather adapts itself based on the current system state. In addition, this adaptation to the import environment occurs in real-time as the images are being imported, such that later images involved in the import may be imported faster than earlier images involved in the import.

The techniques may be embodied in devices, systems, methods, or machine-readable mediums, as will be appreciated. According to one embodiment of the present disclosure, a system is provided that includes at least one processor and a storage medium operatively coupled to the at least one processor and configured to store instructions that when executed by the at least one processor cause the at least one processor to perform operations to import a plurality of image files. The operations include parallel initiations of different stages of an import procedure. For example, one operation includes initiating at a time $t_n$ a fetch operation on a batch of images having batch size of $m_F$, while another operation includes initiating at the time $t_n$ an image processing operation on a batch of images having batch size of $m_P$, while yet another operation includes initiating at the time $t_n$ a database update operation $K_D$ on a batch of images having batch size of $m_D$. The fetch operation is one of $K_F$ total fetch operations operating in parallel with one another and the image processing operation is one of $K_P$ total image processing operations operating in parallel with one another. The MDP, stored, for example, on the storage medium of the system and being executable by the at least one processor, determines values of $K_F$, $K_P$, $m_F$, $m_P$, and $m_D$ for time $t_n$ that results in a higher reward compared to a previous time $t_{n-1}$. The higher reward is associated with a lower import time for the plurality of image files. Numerous examples are described herein with reference to any one of the proceeding figures, and many others will be appreciated in light of this disclosure.

System Architecture

FIG. 1 is a graphical representation of a managed data transfer process 100 that includes three stages, fetching (F), image processing (P), and database updating (D) working together to transfer a plurality of file batches, according to an embodiment. Every batch of files goes through the transfer process in order from F to P to D. The arrows between different instances of F, P, and D represent possible pathways for file batches to traverse through the three stages. A transfer manager 102 uses a Markov decision process to identify the best pathways. In some embodiments, the data transfer process 100 represents an import process, such as for importing image files requested by an application. In some embodiments, the data transfer process 100 represents an export process, such as for exporting image files from an application to some storage device. The illustrated flow of received files (from F to P to D) represents an import process, however, this flow is merely reversed for an export process (files transition from D to P to F). Other example resource-intensive data transfer operations that can benefit from the techniques provided herein as will be apparent.

According to an embodiment, data transfer process 100 involves N parallel instances of image fetch operations ($F_1$-$F_N$) and M parallel instances of image processing operations ($P_1$-$P_M$). A single instance of database updating ($D_1$) may be used as illustrated, however, in some other examples, multiple parallel instances of database updating are used. The number of parallel F and P instances for any given time (e.g., values for N and M at time $T_n$) are governed by the MDP executed by the transfer manager 102, according to an embodiment. The maximum number of allowed parallel instances for each stage may be denoted by $K_F$, $K_P$, and $K_D$ respectively for stages F, P, and D. In some examples, $K_F$=4 such that N is between 1 and 4 at any given time and $K_P$=10 such that M is between 1 and 10 at any given time.

According to an embodiment, each instance (of F, P, D) operates on batches of data (e.g., batches of image files), where a given batch contains one or more files. Hence, a given instance of P (e.g., $P_1$) can operate on $m_P$ number of files, where $1 \leq m_P \leq B_P$, and $B_P$ denotes a max batch size of files running on any instance of P. The batch sizes running on each instance of P do not each need to be the same size. According to an embodiment, the processing stage happens in one or more than one thread (instances $P_1$, $P_2$, etc.) and each of the instances (threads) processes one or more than one file up to a limit of $B_P$. Similarly, a given instance of F (e.g., $F_1$) can operate on $m_F$ number of files, where $1 \leq m_F \leq B_F$, and $B_F$ denotes a max batch size of files running on any instance of F. A max batch size for the database updating instance ($D_1$) is denoted by $B_D$ and instance $D_1$ can operate on $m_D$ number of files, where $1 \leq m_D \leq B_D$. According to an embodiment, correctly configuring the number of parallel instances of F and P as well as the file batch size for each of the instances at any given time results in a lower overall data transfer latency. The values of $m_F$, $m_P$, and $m_D$ at any given time (e.g., time $T_n$) are governed by transfer manager 102 that uses the MDP, according to an embodiment.

The maximum batch sizes for F, P, and D may be determined off-line using, for example, a Monte Carlo analysis or any other risk-management analysis. Example sizes for $B_F$, $B_P$, and $B_D$ are 20, 2000, and 2000 respectively. According to some embodiments, since $B_P$ has a wider range, the range of values for $m_P$ may be reduced by a power of 2 such that $m_P=2^w$, where $w \leq \log_2(B_P)$.

Figure 2:
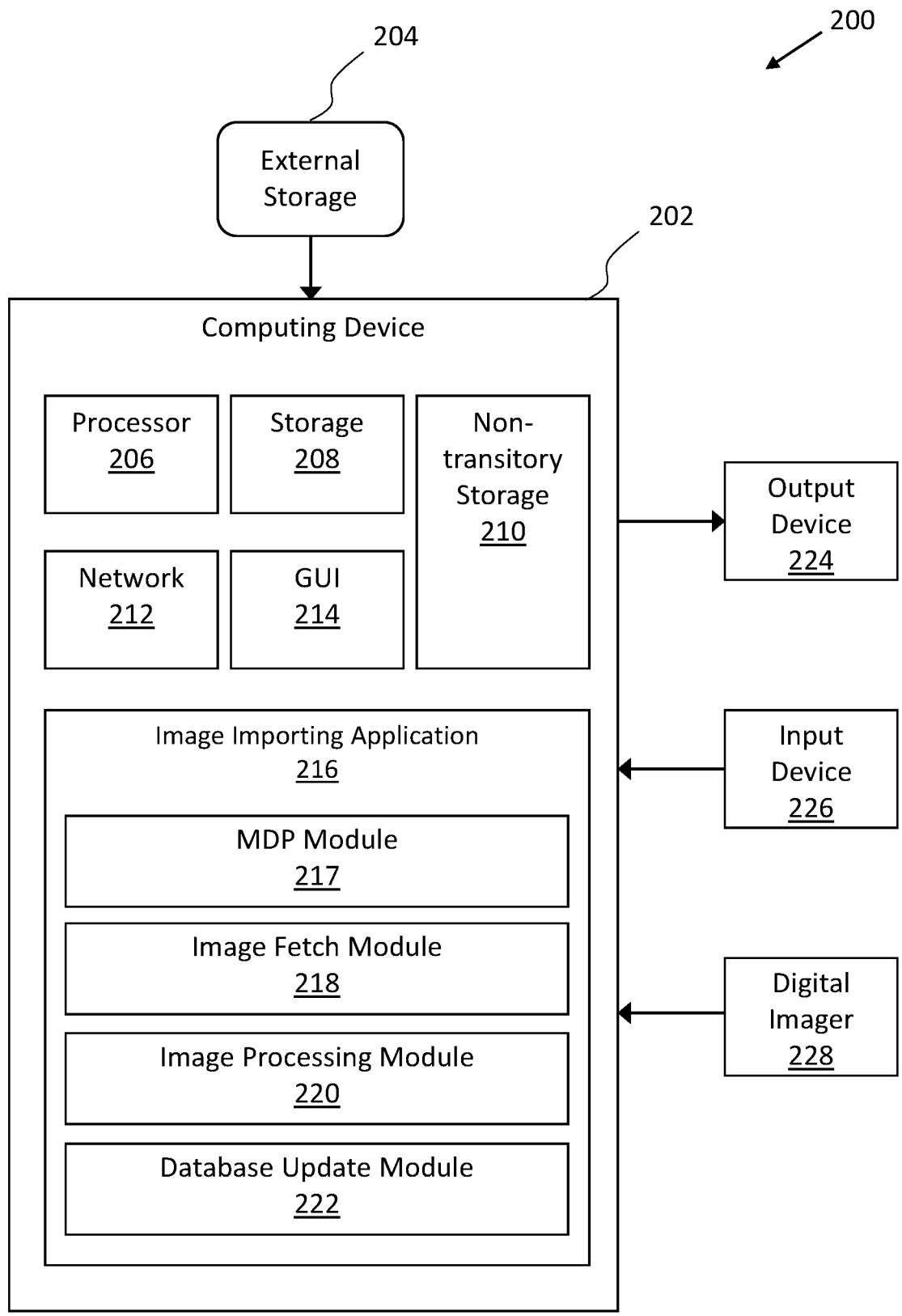
FIG. 2 shows an example system having an image importing application, in accordance with an embodiment of the present disclosure.

FIG. 2 shows an example system 200 that, among other things, implements data transfer process 100 to import a plurality of image files, according to an embodiment. The system 200 includes a computing device 202 having a processor 206, a storage 208, a non-transitory storage media 210, a network interface 212, and an image importing application 216. As will be appreciated, the image importing application 216 may be part of a more comprehensive image processing application. System 200 may also have a graphical user interface (GUI) 214 that may include a display and a user input device. In some embodiments, GUI 214 represents a command-line interface.

According to some embodiments, processor 206 of the computing device 202 is configured to execute the following modules of image importing application 216, each of which is described in further detail below: Markov decision process (MDP) module 217, Image Fetch Module 218, Image Processing Module 220, and Database Update Module 222. In some embodiments, computing device 202 is configured to receive, as inputs, image files from an external storage 204. The image files may be requested by an application running on computing device 202, such as image processing software. External storage 204 may be local to device 202 (e.g., plug-and-play hard drive) or remote to device 202 (e.g., cloud-based storage), and may represent, for instance, a stand-alone external hard-drive, external FLASH drive or any other type of FLASH memory, a networked hard-drive, a server, or networked attached storage (NAS), to name a few examples. In some embodiments, image files can also be requested internally, such as from storage 208. As will be discussed in more detail herein, each of the modules 217, 218, 220, and 222 are used in conjunction with each other to complete the import process for the image files. As can further be seen, image importing application 216 uses a Markov decision process (represented generally by MDP module 217) to improve the speed at which the import process occurs by streamlining the operation of modules 218, 220, and 222.

Computing device 202 can be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), virtual reality (VR) device or VR component (e.g., headset, hand glove, camera, treadmill, etc.) or other form of computing or telecommunications device that is capable of communication and that has sufficient processor power and memory capacity to perform the operations described in this disclosure. A distributed computational system can be provided including a plurality of such computing devices. Further note that device 202 may be, for example, a client in a client-server arrangement, wherein at least a portion of the image importing application 216 is served or otherwise made accessible to device 202 via a network (e.g., the Internet and a local area network that is communicatively coupled to the network interface 212).

Computing device 202 includes one or more storage devices 208 or non-transitory computer-readable media 210 having encoded thereon one or more computer-executable instructions or software for implementing techniques as variously described in this disclosure. The storage devices 208 can include a computer system memory or random access memory, such as a durable disk storage (which can include any suitable optical or magnetic durable storage device, e.g., RAM, ROM, Flash, USB drive, or other semiconductor-based storage medium), a hard-drive, CD-ROM, or other computer readable media, for storing data and computer-readable instructions or software that implement various embodiments as taught in this disclosure. The storage device 208 can include other types of memory as well, or combinations thereof. The non-transitory computer-readable media 210 can include, but are not limited to, one or more types of hardware memory, non-transitory tangible media (for example, one or more magnetic storage disks, one or more optical disks, one or more USB flash drives), and the like. The non-transitory computer-readable media 210 included in the computing device 202 can store computer-readable and computer-executable instructions or software for implementing various embodiments (such as instructions for an operating system as well as an image editing application that includes image importing application 216). The computer-readable media 210 can be provided on the computing device 202 or provided separately or remotely from the computing device 202.

The computing device 202 also includes at least one processor 206 for executing computer-readable and computer-executable instructions or software stored in the storage device 208 or non-transitory computer-readable media 210 and other programs for controlling system hardware. Processor 206 may have multiple cores to facilitate parallel processing or may be multiple single core processors. Any number of processor architectures can be used (e.g., central processing unit and co-processor, graphics processor, digital signal processor). Virtualization can be employed in the computing device 202 so that infrastructure and resources in the computing device 202 can be shared dynamically. For example, a virtual machine can be provided to handle a process running on multiple processors so that the process appears to be using only one computing resource rather than multiple computing resources. Multiple virtual machines can also be used with one processor. Network interface 212 can be any appropriate network chip or chipset which allows for wired or wireless connection between the computing device 202 and a communication network (such as local area network) and other computing devices and resources.

A user can interact with the computing device 202 through an output device 224, such as a screen or monitor, which can display one or more user interfaces or images, including any one or more of the imported images, as provided in accordance with some embodiments. Computing device 202 can include input or input/output devices 226 for receiving input from a user, for example, a keyboard, a joystick, a game controller, a pointing device (e.g., a mouse, a user's finger interfacing directly with a touch-sensitive display device, etc.), or any suitable user interface, including an AR headset. The computing device 202 can further include a digital imager 228 configured to acquire images that may be imported using image import application 216. The digital imager 228 can be a digital camera, digital document scanner, or other device configured to acquire images and convert the images into digital image files. The computing device 202 may include any other suitable conventional I/O peripherals. In some embodiments, computing device 202 includes or is operatively coupled to various suitable devices for performing one or more of the aspects as variously described in this disclosure.

The computing device 202 can run any operating system, such as any of the versions of Microsoft® Windows® operating systems, the different releases of the Unix® and Linux® operating systems, any version of the MacOS® for Macintosh computers, any embedded operating system, any real-time operating system, any open source operating system, any proprietary operating system, any operating systems for mobile computing devices, or any other operating system capable of running on the computing device 202 and performing the operations described in this disclosure. In an embodiment, the operating system can be run on one or more cloud machine instances.

In other embodiments, the functional components/modules can be implemented with hardware, such as gate level logic (e.g., FPGA) or a purpose-built semiconductor (e.g., ASIC). Still other embodiments can be implemented with a microcontroller having several input/output ports for receiving and outputting data, and several embedded routines for carrying out the functionality described in this disclosure. In a more general sense, any suitable combination of hardware, software, and firmware can be used, as will be apparent.

As will be appreciated in light of this disclosure, the various modules and components of the system, such as any of image importing application 216, MDP module 217, image fetch module 218, image processing module 220, database update module 222, GUI 214, or any combination of these, may be implemented in software, such as a set of instructions (e.g., HTML, XML, C, C++, object-oriented C, JavaScript®, Java®, BASIC, etc.) encoded on any machine-readable medium or computer program product (e.g., hard drive, server, disc, or other suitable non-transitory memory or set of memories), that when executed by one or more processors, cause the various methodologies provided in this disclosure to be carried out. It will be appreciated that, in some embodiments, various functions and data transformations performed by the user computing system, as described in this disclosure, can be performed by one or more suitable processors in any number of configurations and arrangements, and that the depicted embodiments are not intended to be limiting. Various components of this example embodiment, including the computing device 202, can be integrated into, for example, one or more desktop or laptop computers, workstations, tablets, smart phones, game consoles, VR devices, set-top boxes, or other such computing devices. Other componentry and modules typical of a computing system, will be apparent.

According to some embodiments, MDP module 217 generally represents a Markov decision process that is used to perform various functions that dictate how imported images are processed using various instances of fetching, processing, and updating. A given fetch instance is described in more detail with reference to image fetch module 218, a given processing instance is described in more detail with reference to image processing module 220, and a given update instance is described in more detail with reference to database updated module 222. According to some embodiments, MDP module 217 determines parameters such as image batch sizes and number of parallel instances of each stage of the import process (e.g., fetching, processing, and updating) over time to determine a fastest and most efficient route for importing the images. The details of the various functions of MDP module 217 are described more thoroughly with reference to FIGS. 2 and 4.

According to some embodiments, Image Fetch Module 218 is configured to copy a particular batch of image files from a first location to a second location. The first location may be an internal memory location or an external memory location such as external storage 204. The second location may be a temporary storage location while the images are to be accessed and/or worked on using an image processing application. In some embodiments, the second location is any storage location on either storage 208 or non-transitory storage 210. According to some embodiments, Image Fetch Module 218 represents a plurality of fetching instances that operate in parallel to bring over batches of images at the same time. The size of the image batches and the number of parallel fetching instances are controlled via MDP module 217 of image importing application 216, according to some embodiments.

According to some embodiments, Image Processing Module 220 is configured to process one or more commands related to any form of image processing. For example, metadata associated with any number of the images copied using Image Fetch Module 218 may be processed using Image Processing Module 220. The metadata may include various information associated with a given image file, such as thumbnail data, copyright data, image orientation data, color profile data, date/time/location data, etc. Such data can be extensive for certain image files. The metadata may be used by the application that is requesting the images to perform various functions such as, for example, preset or keyword association with the images, facial recognition, global positioning system (GPS) coordinate harvesting, and for generating preview samples of the images. According to some embodiments, Image Processing Module 220 represents a plurality of processing instances that operate in parallel to extract image metadata from received batches of images at the same time. The size of the image batches and the number of parallel processing instances are controlled via MDP module 217 of image importing application 216, according to some embodiments.

According to some embodiments, Database Update Module 222 is configured to update an image database used by the application that is requesting the images. The image database is represented as a persistent filesystem that contains tabulated information regarding each of the images, according to some embodiments. According to some embodiments, Database Update Module 222 represents a plurality of database update instances that operate in parallel to update the database with a received batch of images at the same time. In some embodiments, a single database update instance receives batches of images and updates the database with the received batches of images. The size of the image batches are controlled via MDP module 217 of image importing application 216, according to some embodiments.

Figure 3:
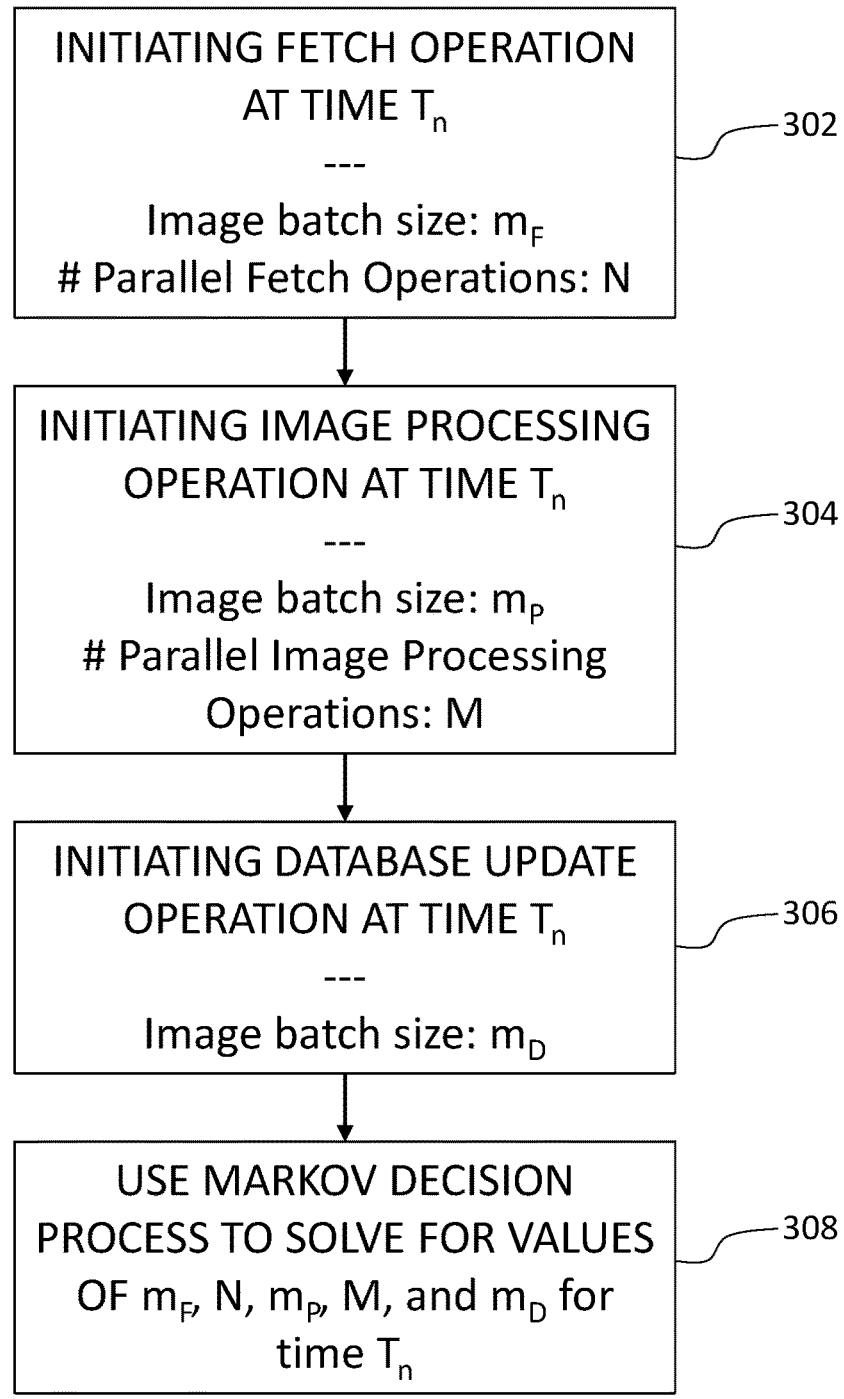
FIG. 3 is a flow diagram of an image import process, in accordance with some embodiments of the present disclosure.

FIG. 3 illustrates an example flow diagram having various operations of an image import method 300, according to an embodiment. Method 300 may be performed, for example, in whole or in part by image importing application 216. The operations, functions, or actions described in the respective blocks of example method 300 may be stored as computer-executable instructions in a non-transitory computer-readable medium, such as a memory and/or a data storage of a computing system. As will be further appreciated in light of this disclosure, for this and other processes and methods disclosed herein, the functions performed in method 300 may be implemented in a differing order. Additionally, or alternatively, two or more operations may be performed at the same time or otherwise in an overlapping contemporaneous fashion. According to an embodiment, each of blocks 302, 304, 306, and 308 are performed in parallel at a given time $T_n$, and are continuously performed over time until all images are successfully imported. Accordingly, method 300 continues to run while the images are being imported (e.g. in real time) to continuously determine a most efficient way to import the remaining images, thus leading to an overall faster import time.

At block 302, a fetch operation is initiated at a time $T_n$, according to an embodiment. The fetch operation may be one fetch operation of N parallel instances of fetch operations occurring at time $T_n$. In this example embodiment, the fetch operation is performed on a batch of images having a batch size of $m_F$. The batch of images is a subset of the total number of images to be imported. According to some embodiments, the batch size $m_F$ of the fetch operation may be different at times other than $T_n$, and the value of N may also change at times other than $T_n$. Furthermore, each of the N fetch operations can have a different value for $m_F$.

According to some embodiments, the fetch operation copies a particular batch of image files from a first location to a second location. The second location may be a local storage location that can be quickly accessed by the application requesting the import of the image files, such as an internal hard drive or system random access memory (RAM). The first location may be external to the computing system that is requesting the import of the image files, such as any type of portable memory or networked memory (e.g., cloud-based storage, or a local storage facility). In a more general sense, the fetch operation copies or moves a particular batch of files from a first storage location to a second location where the files can be operated on or otherwise processed by the requesting application.

At block 304, an image processing operation is initiated at a time $T_n$, according to an embodiment. The image processing operation may be one image processing operation of M parallel instances of image processing operations occurring at time $T_n$. The image processing operation is performed on a batch of images having a batch size of $m_P$. The batch of images may be received from one or more of the parallel fetch operations. According to some embodiments, the batch size $m_P$ of the fetch operation may be different at times other than $T_n$, and the value of M may also change at times other than $T_n$. Furthermore, each of the M fetch operations can have a different value for $m_P$.

According to some embodiments, the image processing operation processes metadata associated with any number of the images copied during the fetch operation. The metadata may include various information associated with a given image file, such as thumbnail data, copyright data, image orientation data, color profile data, date/time/location data, etc. Such data can be used, for example, to invoke one or more commands and can be extensive for certain image files and thus can create a strain on the import process. In a more general sense, the processing operation can include one or more processes that operate on the associated files being retrieved during the fetch operation. Such processes may involve, for example, accessing metadata associated with the file and that can be accessed without actually opening the file, or accessing metadata that is embedded within the file and that can be accessed after opening the file, or opening the file and executing an operation on that file.

At block 306, a database update operation is initiated at a time $T_n$, according to an embodiment. The database update operation may be the only database update operation occurring at time $T_n$, while in other embodiments there may be a plurality of database update operations that are executed in parallel (such as in the case where the database is distributed over a number of locations). In this example, the database update operation is performed on a batch of images having a batch size of $m_D$. The batch of images may be received from one or more of the parallel image processing operations. According to some embodiments, the batch size $m_D$ of the database update operation may be different at times other than $T_n$.

According to some embodiments, the database update operation updates an image database used by the application that is requesting the import of the image files. The image database may be represented as a persistent filesystem that contains tabulated information regarding each of the images. In a more general sense, the database update operation updates any file storage facility used by the application that is requesting the transfer of the files that can be processed by that application.

At block 308, a Markov decision process (MDP) is used to determine values of $m_F$, N, $m_P$, M, and $m_D$ for time $T_n$ that yield a higher reward compared to a previous time $T_{n-1}$, according to an embodiment. The MDP dynamically finds the best solution for each system state, with a state being equivalent to a snapshot of all of the image files being processed by each import stage (fetching, processing, and database updating) at a single moment in time. According to an embodiment, the MDP continues to run until all of the requested images have been successfully imported.

Figure 4:
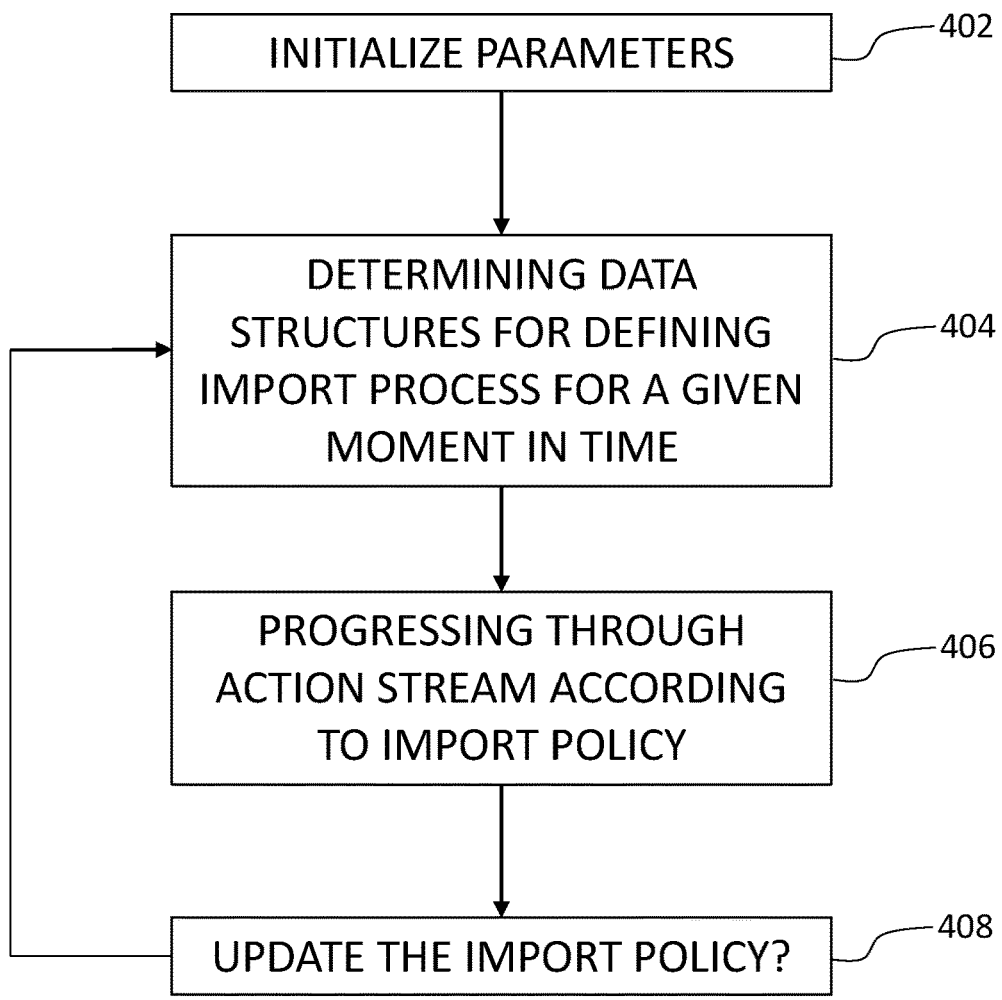
FIG. 4 is a flow diagram of a Markov decision process being used to facilitate import of images, in accordance with some embodiments of the present disclosure.

FIG. 4 illustrates an example method 400 having various operations of a MDP, according to an embodiment. For example, method 400 provides more detailed operations of the MDP process described in block 308 from FIG. 3. The operations, functions, or actions described in the respective blocks of example method 400 may be stored as computer-executable instructions in a non-transitory computer-readable medium, such as a memory and/or a data storage of a computing system. As will be further appreciated in light of this disclosure, for this and other processes and methods disclosed herein, the functions performed in method 400 may be implemented in a differing order. Additionally, or alternatively, two or more operations may be performed at the same time or otherwise in an overlapping contemporaneous fashion.

Method 400 begins with block 402 where certain parameters are initialized to set the stage for the import process to take place, according to an embodiment. A state s of the import process may be denoted by the triplet $(n_F, n_P, n_D)$ with $n_F$=all images processed by stage F at time t, $n_P$=all images processed by stage P at time t, and $n_D$=all images processed by stage D at time t. Two states, $(n_F, n_P, n_D)$ and $(n_F', n_D', n_D')$ may be considered equivalent when round$(\log_2(n_S))$=round$(\log_2(n_{S'}))$, $\forall S \in \{F,P,D\}$.

During initialization, the state s is set to (0, 0, 0). The legitimate actions in the initial state only include running n Images through a Fetch operation, according to an embodiment. All other import stages (e.g., P and D) are non-working during initialization. Also, n is capped at the total number of image files available. In some embodiments, an import policy $\pi(a|s)$ is also initialized, where $a \in A(s)$ and A(s) is the set of permittable actions in state s. Further details regarding the import policy are provided with reference to blocks 404, 406, and 408.

Method 400 continues with block 404 where various data structures that define the MDP are determined for a given moment in time, according to an embodiment. These data structures may be continually updated over time based on an import policy $\pi$ and/or the determinations made at block 406, as will be discussed in more detail herein. Various examples of data structures used by the MDP are described in more detail below:

a, Action: The actions that can be taken at each instance are described in more detail with reference to FIG. 5. According to an embodiment, two actions are considered adjacent, when the image batch size in them are either half of the other or double of the other. The one having the higher image batch size is called a right neighbor (for action a it is denoted by Ra), the other with smaller batch size is called a left neighbor (La).

R, Reward: The MDP moves from one state to another based on a performed action a, $s \xrightarrow{a} s'$ and generates an associated reward R.

$t_n$, Time: The MDP moves along a horizon, where each instance where a decision is taken is denoted by $t_n$, where t is actual time value, and n is instance count, starting from 0. In some embodiments, except for delay calculations, t is not directly used, and only instance count n is considered. Accordingly, the state may be denoted at any time t as $s_n$ and the reward may be denoted as $R_n$.

$\pi$, Import Optimization Policy: The MDP devises an optimal policy $\pi$ (e.g., to do the image Import effectively) in order to choose an Action a based on current the state s, according to an embodiment. Thus the MDP specifies the probability, $\pi(a|s)$.

p, Probabilities: p(s', r|s, a) specifies the probability of the MDP to move between states (e.g., s→s'), based on an action a, and with reward R.

v,q, Value Function: The value functions $v_\pi(s)$ and $q_\pi(s', a)$ may be estimated under the policy $\pi$; according to an embodiment. This can use a standard reinforcement learning setting as shown in the equations below:

$$v_\pi(s) \doteq \mathbb{E}_\pi\{(\Sigma_{k=0}^\infty \gamma^n R_{n+k+1})|s_n=s\},$$

$$q_\pi(s,a) \doteq \mathbb{E}_\pi\{(\Sigma_{k=0}^\infty \gamma^n R_{n+k+1})|s_n=s, a_n=a\}, \text{ where}$$
$\gamma<1$.

According to an embodiment, the dynamic policy updating is based on empirical information V(s) about values v(s), and empirical information Q(s, a) about action-values q(s, a). These estimates may be performed using Monte Carlo methods and/or temporal difference analysis. At each reward instant, the value for Q(s, a) may be saved in a persistent hash table.

According to an embodiment, for states $s_1=(a_1,b_1,c_1)$, $s_2=(a_2,b_2, c_2)$, $s_1'=(a_1', b_1', c_1')$, $s_2=(a_2', b_2', c_2')$, the following assumption can be made:
$p(s_2, r|s_1, a)=p(s_2', r|s_2', a)$, when, $a_1-a_2=a_1'-a_2'$, $b_1-b_2=b_1'-b_2'$, $c_1-c_2=c_1'-c_2'$.

This assumption means that the probabilities are translation invariant. For example, the assumption is that importing from 5001 to 6000 images should involve the same possible actions and time as importing from 2001 to 3000 images.

Method 400 continues with block 406 where the MDP progresses through an action stream (e.g., $s_0, a_0, r_1, s_1, a_1, r_2, s_2, a_2, \ldots$) where actions are made according to the import policy $\pi$, according to an embodiment. The import policy prescribes the probability of choosing an action a when in the state s. Accordingly, an action may be sampled using $\pi(a|s)$. According to an embodiment, in all cases, $$\pi(a \mid s) = \frac{1}{|A(s)|}.$$

Q(a, s) may be arbitrarily initialized, for a given s and all of its actions a∈A(s). After initialization, the MDP algorithm proceeds to run:

for each (r, s', a') in action reward stream $r_1, s_1, a_1, r_2, s_2, a_2, \ldots$ $Q(s, a) \leftarrow Q(s, a) + \alpha_0[r + \gamma Q(s', a') - Q(s, a)]$
$Q(s, Ra) \leftarrow Q(s, ba) + \alpha_+[r + \gamma Q(s', a') - Q(s, Ra)]$
$Q(s, La) \leftarrow Q(s, ba) + \alpha_-[r + \gamma Q(s', a') - Q(s, La)]$ The various actions ($a_0$, $a_1$, etc.) may be performed at each stage of the import process (e.g., each of the F, P, and D stages), according to an embodiment. The possible actions relate to determining if a next image (or batch of images) to be imported should be processed using a current stage, or if a parallel instance of the stage should be created for processing the new image or batch of images. Further details regarding the actions are provided herein with reference to FIG. 5.

The determination of reward ($r_1$, $r_2$, etc.) may be made for each action, according to an embodiment. The reward is calculated based on whether or not the import time for a particular image (or batch of images) and/or the processing time at a particular stage decreased based on the action taken at a current time compared to a previous time. If the import/processing time is determined to have decreased, then the reward is higher and vice versa. Further details regarding the determination of reward are provided herein with reference to FIGS. 6 and 7.

At block 408, a determination is made whether to update the import policy π, according to an embodiment. The Import Policy π is not a preset policy but rather π updates itself dynamically, based on changes in the environment, according to an embodiment. Hence, policies change at regular intervals, $\pi_0 \rightarrow \pi_1 \rightarrow \ldots \rightarrow \pi_k$. Updated policies may be stored on the computing device that executes the MDP. According to some embodiments, the updated policies are stored in a persistent way so that they can be used across import sessions.

According to an embodiment, after every successive import of a threshold number of images or more than the threshold number of images, the import policy is updated (e.g., π(a|s)←Q(s,a)) with appropriate normalization. In one example, the threshold number of images is 100 images. According to some embodiments, the MDP is based on principles of avoiding frequent updates to π and on giving preferences to adjacent actions, with a higher preference given to the action where the image batch size increases.

Following block 408, method 400 continues back with block 404 at a later moment in time (e.g., a next state s) to proceed with determining various actions to take and calculating rewards. According to an embodiment, the MDP attempts to take actions that result in a higher reward compared to a previous state, thus dynamically determining a better process for importing images as they are being imported, according to an embodiment.

Figure 5:
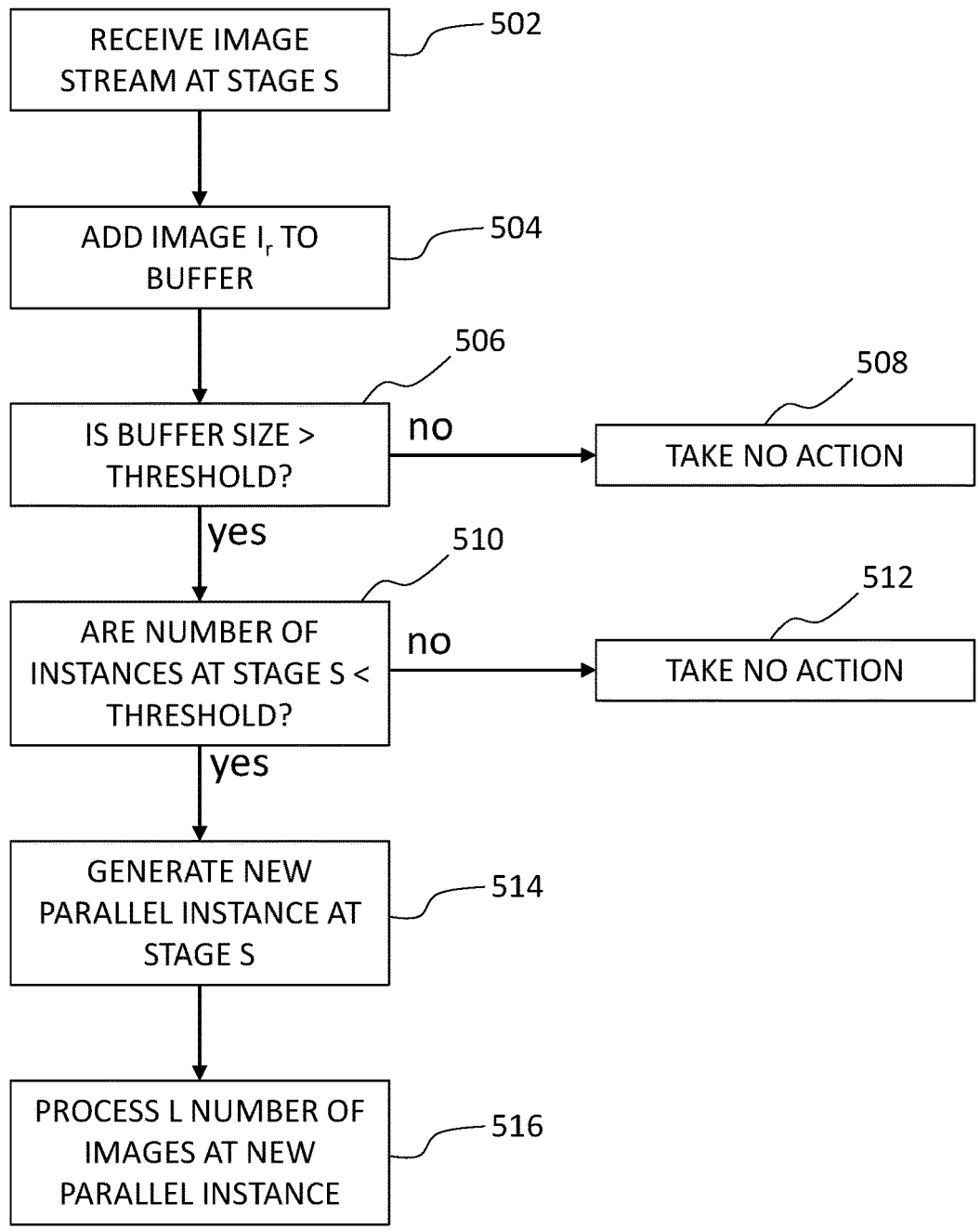
FIG. 5 is a flow diagram of actions taken when receiving images at a given stage of the import operation, in accordance with some embodiments of the present disclosure.

FIG. 5 is a flow diagram of an example method 500 for taking certain actions when a batch of images arrives at any given stage (F, P, or D), in accordance with an embodiment. Method 500 may be performed, for example, in whole or in part by image importing application 216, MDP module 217, Image Fetch Module 218, Image Processing Module 220, Database Update Module 222, or any combination of these, such as described with respect to FIG. 2. The operations, functions, or actions described in the respective blocks of example method 500 may also be stored as computer-executable instructions in a non-transitory computer-readable medium, such as a memory and/or a data storage of a computing system. As will be further appreciated in light of this disclosure, for this and other processes and methods disclosed herein, the functions performed in method 500 may be implemented in a differing order. Additionally, or alternatively, two or more operations may be performed at the same time or otherwise in an overlapping contemporaneous fashion.

Method 500 begins with block 502 where an image stream (e.g., a batch of images) is received at stage S, where stage S can represent any of stages F, P, or D. Each stage may be managed separately by MDP module 117 to determine what actions to take with the newly arrived batch of images. Some possible actions include adding one or more instances of the given stage S, processing a new batch size of images at the newly created one or more instances, or adding any of the received images of the image stream to a buffer on stage S.

Method 500 continues to block 504 where a given image (represented as image $I_r$) of the received image stream is added to a buffer associated with the particular stage S. In some embodiments, each stage (F, P, and D) includes a separate buffer for temporarily storing the received images. Note that r may begin at a value corresponding to a first image of the image stream. After an action (or no action) is taken for image $I_r$, r may be increased by 1 and method 500 repeats itself using the next image. This process may repeat until all images have been operated on in the received image stream.

Method 500 continues to block 506 where a determination is made whether the buffer size (e.g., # of stored images in the buffer) of the given stage S has exceeded a first threshold. These buffer thresholds may be maximum image batch sizes for the given stage as discussed above. Accordingly, the buffer threshold for stage F may be equal to $B_F$, the buffer threshold for stage P may be equal to $B_P$, and the buffer threshold for stage D may be equal to $B_D$. If the buffer size does not exceed the threshold, then method 500 continues to block 508 where no further action is taken with regards to the current image $I_r$.

If the buffer size does exceed the threshold at block 506, then method 500 continues to block 510 where another determination is made whether the number of parallel instances at stage S are less than a second threshold, according to an embodiment. The second threshold may be maximum number of allowed instances for a given stage as discussed above. Accordingly, the second threshold for stage F may be equal to $K_F$, the second threshold for stage P may be equal to $K_P$, and the second threshold for stage D may be equal to $K_D$. If the current number of parallel instances at stage S equals (or exceeds) the second threshold, then method 500 continues to block 512 where no further action is taken with regards to the current image $I_r$.

If the current number of parallel instances at stage S is less than the second threshold, then method 500 continues to block 514 where a new parallel instance is generated at stage S, according to an embodiment. Method 500 continues on to block 516 where L number of new images are processed using the newly created parallel instance. According to an embodiment, L is equivalent to the image batch size of the new instance and is determined via the MDP.

Figure 6:
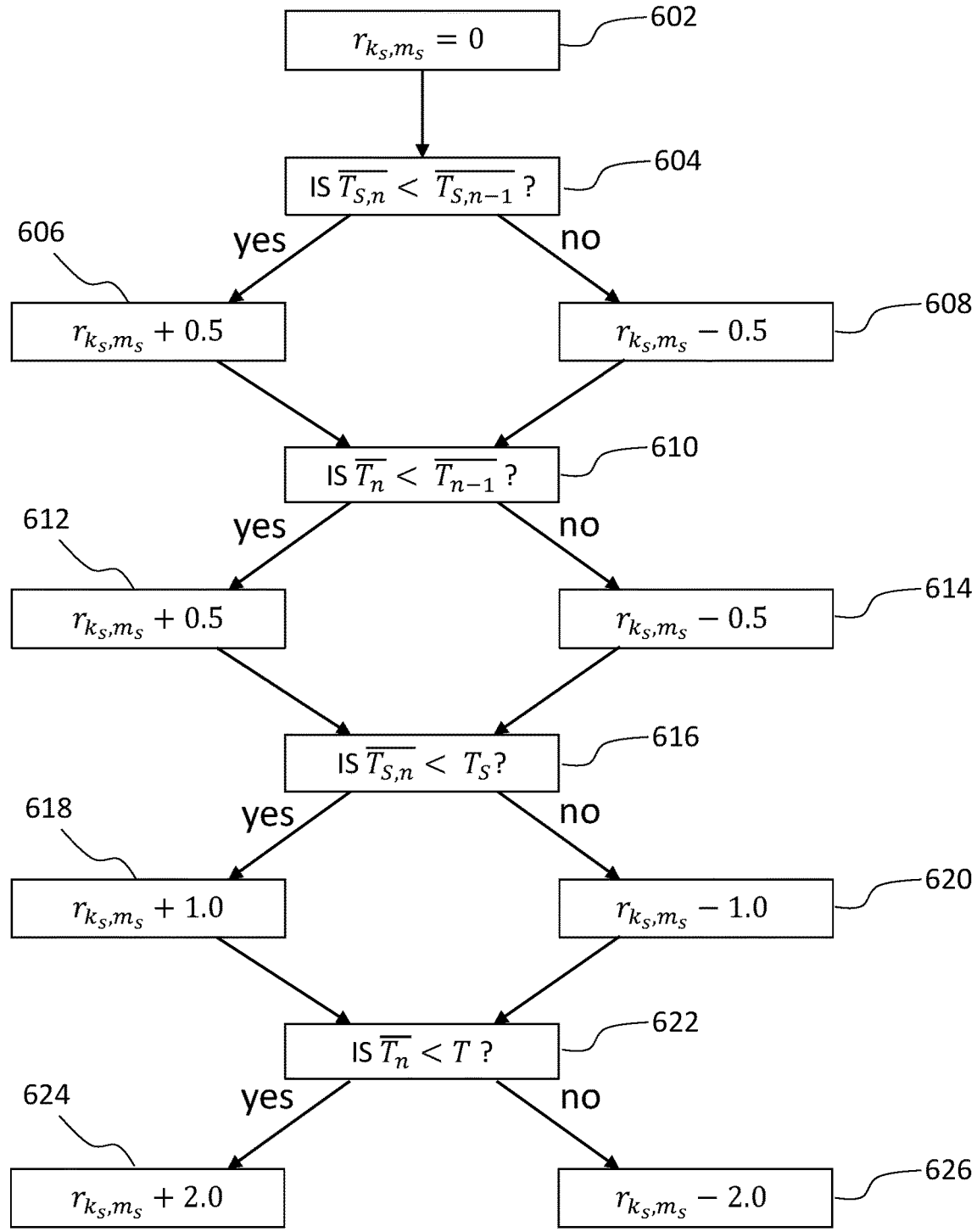
FIG. 6 is a flow diagram of determining a reward after completing an action during the image import process, in accordance with some embodiments of the present disclosure.

FIG. 6 is a flow diagram of an example method 600 for determining a reward value after each action is taken for each instance, in accordance with an embodiment. Put another way, rewards are calculated at each time $t_n$ where n is the instance at which a given action has been taken. Method 600 may be performed, for example, in whole or in part by image importing application 216, MDP Module 217, Image Fetch Module 218, Image Processing Module 220, Database Update Module 222, or any combination of these, such as described with respect to FIG. 2. The operations, functions, or actions described in the respective blocks of example method 600 may also be stored as computer-executable instructions in a non-transitory computer-readable medium, such as a memory and/or a data storage of a computing system. As will be further appreciated in light of this disclosure, for this and other processes and methods disclosed herein, the functions performed in method 600 may be implemented in a differing order. Additionally, or alternatively, two or more operations may be performed at the same time or otherwise in an overlapping contemporaneous fashion.

Method 600 begins with block 602 where an initial reward value is set to zero. The number of instances $k_s$ and the number of images $m_s$ run by a given action are denoted by the pair $k_s$, $m_s$. The running reward associated with this pair is denoted by $r_{k_s,m_s}$.

Method 600 continues to block 604 where a determination is made whether the average time of processing images at any stage S ($\overline{T_{S,n}}$) is less than the average time of processing images at any stage S during the previous action ($\overline{T_{S,n-1}}$), the previous action occurring at a previous moment in time. If $\overline{T_{S,n}}$ is less than $\overline{T_{S,n-1}}$, then this represents an overall decrease in the average time of processing images and method 600 moves to block 606 where the reward $r_{k_s,m_s}$ is incremented by 0.5. If $\overline{T_{S,n}}$ is not less than $\overline{T_{S,n-1}}$, then the action resulted in either increasing the average time of processing images or not changing it at all, so method 600 moves to block 608 where the reward $r_{k_s,m_s}$ is decremented by 0.5.

Regardless of what decision is made in block 604, method 600 proceeds to block 610 where another reward decision is made, according to an embodiment. In block 610, a determination is made whether the average overall time of importing an image ($\overline{T_n}$) is less than the average overall time of importing an image during the previous action ($\overline{T_{n-1}}$), the previous action occurring at a previous moment in time. If $\overline{T_n}$ is less than then this represents an overall decrease in the average overall time of importing an image and method 600 moves to block 612 where the reward $r_{k_s,m_s}$ is incremented by 0.5. If $\overline{T_n}$ is not less than $\overline{T_{n-1}}$ then the action resulted in either increasing the average overall time of importing an image or not changing it at all, so method 600 moves to block 614 where the reward $r_{k_s,m_s}$ is decremented by 0.5.

Regardless of what decision is made in block 610, method 600 proceeds to block 616 where another reward decision is made, according to an embodiment. In block 616, a determination is made whether the average time of processing images at any stage S ($\overline{T_{S,n}}$) is less than a global minimum of the average time of processing images at any stage S (e.g., $T_S$=min($\overline{T_{S,n}}$). If $\overline{T_{S,n}}$ is less than $T_S$, then this represents a general decrease in the overall time of importing an image and method 600 moves to block 618 where the reward $r_{k_s,m_s}$ is incremented by 1.0. If $\overline{T_{S,n}}$ is not less than $T_S$, then the action resulted in either increasing the overall time of importing an image or not changing it at all, so method 600 moves to block 620 where the reward $r_{k_s,m_s}$ is decremented by 1.0.

Regardless of what decision is made in block 616, method 600 proceeds to block 622 where another reward decision is made, according to an embodiment. In block 622, a determination is made whether the average overall time of importing an image ($\overline{T_n}$) is less than a global minimum of the average overall time of importing an image (e.g., T=min( $\overline{T_n}$)). If $\overline{T_n}$ is less than T, then this represents a general decrease in the overall time of importing an image and method 600 moves to block 624 where the reward $r_{k_s,m_s}$ is incremented by 2.0. If $\overline{T_n}$ is not less than T, then the action resulted in either increasing the overall time of importing an image or not changing it at all, so method 600 moves to block 626 where the reward $r_{k_s,m_s}$ is decremented by 2.0.

The final calculated reward for any given action depends on the outcomes of each of decision blocks 604, 610, 616, and 622, according to an embodiment. It should be noted that the exact reward values provided in method 600 are just one example, and that any reward values can be provided. According to some embodiments, the ±reward value resulting from decision block 622 is greater than the ±reward value resulting from decision block 616, while the ±reward value resulting from decision block 616 is greater than the ±reward values resulting from either decision block 604 or decision block 610. In some embodiments, the ±reward value resulting from decision block 604 is the same as the ±reward value resulting from decision block 610. For a given performed action in the import process, a higher reward reflects a lower overall import time associated with that action and vice versa. Accordingly, actions that result in higher rewards are more likely to be performed again on later image batches while actions that result in lower rewards are less likely to be performed again.

Figure 7:
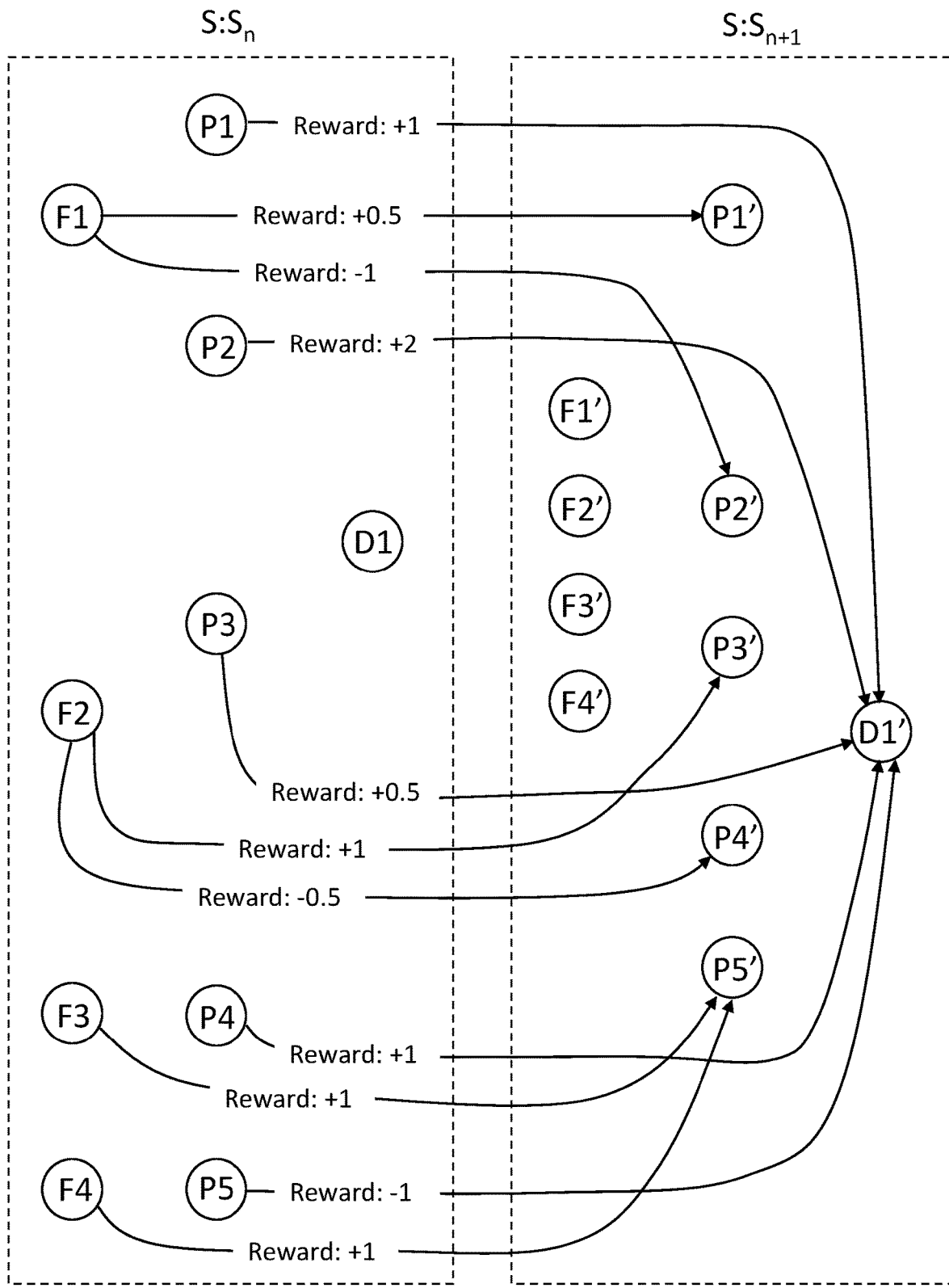
FIG. 7 is an example diagram of reward distribution for various possible actions between a first state and a second state of the import process, in accordance with some embodiments of the present disclosure.

FIG. 7 illustrates an example diagram of reward distribution for various possible actions between a first state and a second state of the import process, according to an embodiment. The first state is denoted by $S_n$ and provides a snapshot of the import process at a first moment in time, and a second state is denoted by $S_{n+1}$ and provides a second snapshot of the import process at a second moment in time after the first moment in time. The illustration provides possible paths and example rewards given for each path taken by a batch of images as they move from one an instance of one stage to an instance of the next stage in the import process (e.g., F→P or P→D). That is, image batches move from an instance of F at state $S_n$ to an instance of P at state $S_{n+1}$, and image batches from an instance of P at state $S_n$ to an instance of D at state $S_{n+1}$.

In the illustrated example, image batches at instance F1 of state $S_n$ have the option of being processed by processing instance P1' or P2' of state $S_{n+1}$. However, the reward associated with either option is different. For example, the reward for processing the batch of images next with instance P1' is 0.5 while the reward for processing the batch of images next with instance P2' is −1. This may represent a situation where the MPD algorithm determined that the overall import time for the batch of images decreases when using processing instance P1' as compared to processing instance P2'. In another example, all image batches being processed by processing instances P of state $S_n$ will move to being processed by instance D1' in state $S_{n+1}$. However, the rewards are different depending on which processing instance P1-P5 was used. Some processing instances yield a higher reward than others based on how the processing affects the import time.

It should be noted that FIG. 5 illustrates one example moment in time during the transition between two states, and that each state transition can have different rewards and possible pathways as dictated by the MDP. In other words, the MDP constantly updates the rewards associated with each action choice at each instance across multiple states in an effort to converge on a best possible solution (e.g., a lowest achievable import time for the total # of images).

Import Results

FIGS. 8-11 are line graphs showing improvement of import speed for different types and sizes of images, in accordance with some embodiments of the present disclosure. The import speed results were measured across different import configurations using the same software program to request the import.

Figure 8:
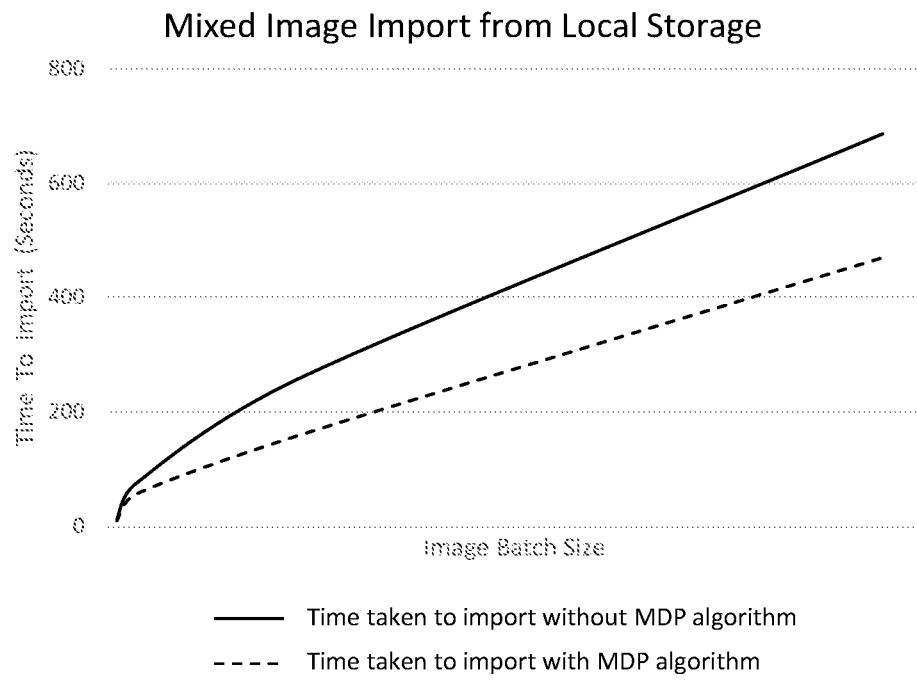
FIGS. 8-11 are graphs showing improvement of import speed for different types and sizes of images, in accordance with some embodiments of the present disclosure.

FIG. 8 is a line graph showing import time for increasing mixed image batch sizes when using the MDP compared to import time when not using the MDP, according to an embodiment. The images were imported from local storage (e.g., from a local hard drive). The imported images consisted of a mixed set of different types of image files and import was performed on batch sizes that ranged from 500 images to 40,000 images. As can be seen, the MDP reduced the import time for all mixed image batch sizes. The import time was decreased by between 23% and 38% when using the MDP.

Figure 9:
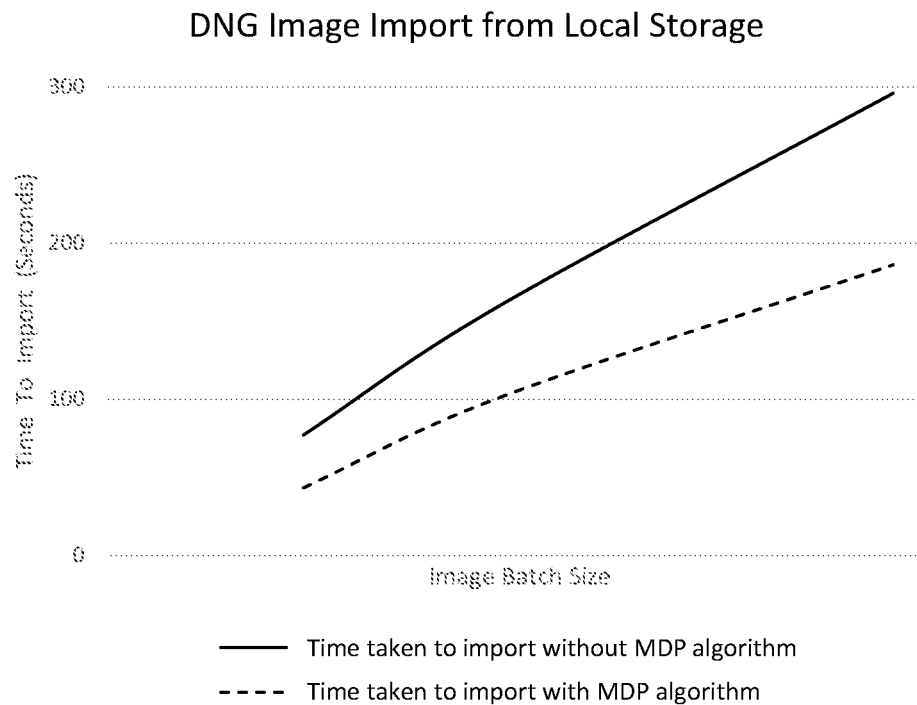

FIG. 9 is a line graph showing import time for increasing digital negative (DNG) image batch sizes when using the MDP compared to import time when not using the MDP, according to an embodiment. The images were imported from local storage (e.g., from a local hard drive). The imported images consisted only of DNG image files and import was performed on batch sizes that ranged from 1500 images to 6,000 images. As can be seen, the MDP reduced the import time for all DNG image batch sizes, especially for larger image batch sizes. The import time was decreased by between 37% and 44% when using the MDP.

Figure 10:
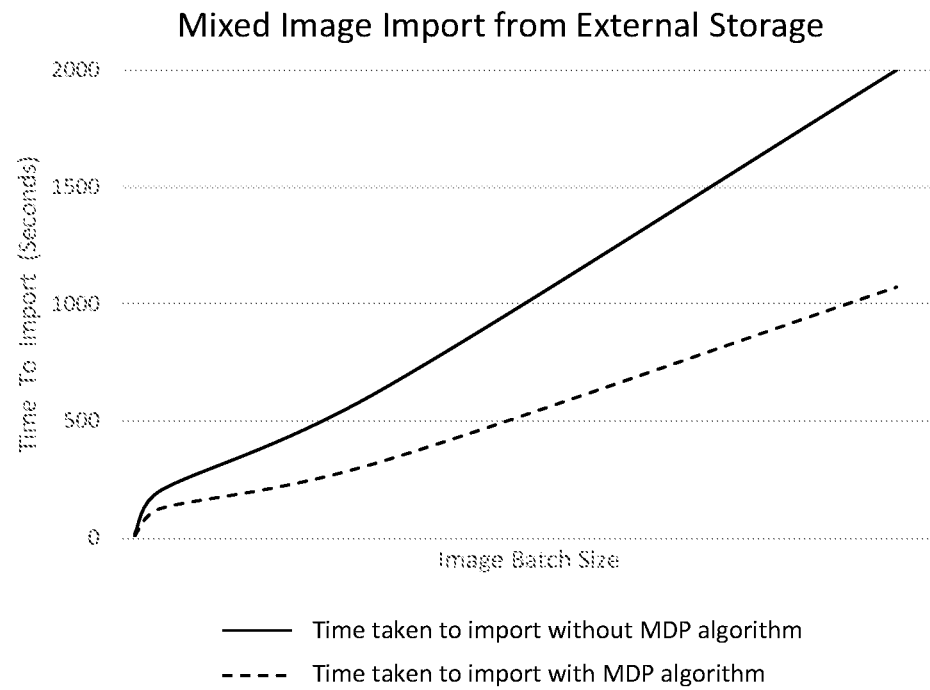

FIG. 10 is a line graph showing import time for increasing mixed image batch sizes when using the MDP compared to import time when not using the MDP, according to an embodiment. The images were imported from an SD card (e.g., external storage), thus increasing the overall import time compared to local storage. The imported images consisted of a mixed set of different types of image files and import was performed on batch sizes that ranged from 500 images to 30,000 images. As can be seen, the MDP reduced the import time for all mixed image batch sizes, and the improvement is especially observed for larger image batch sizes. The import time was decreased by between 37% and 48% when using the MDP.

Figure 11:
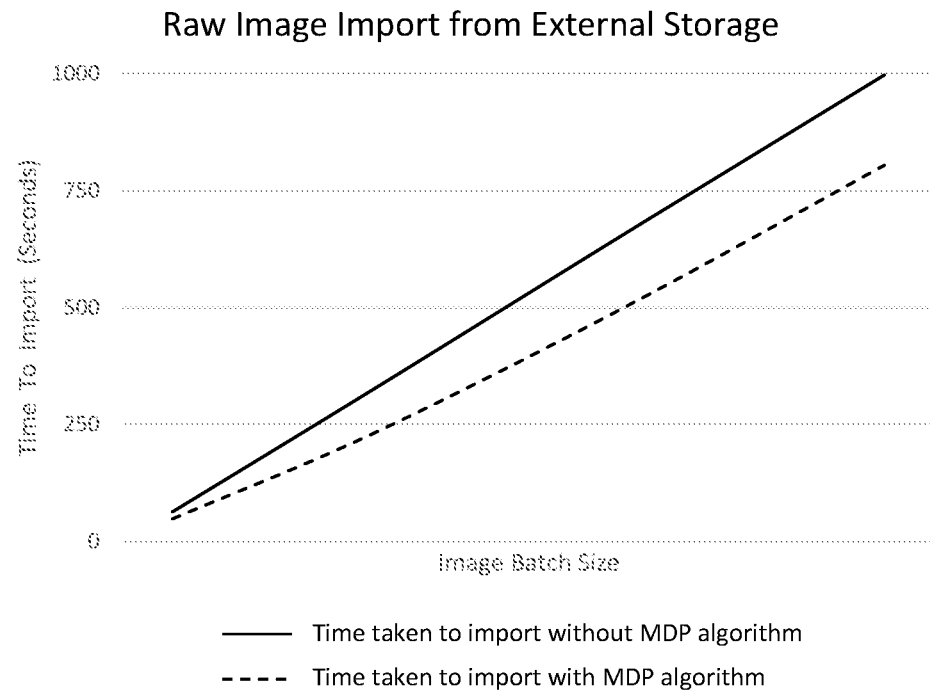

FIG. 11 is a line graph showing import time for increasing raw image batch sizes when using the MDP compared to import time when not using the MDP, according to an embodiment. The images were imported from an SD card (e.g., external storage), thus increasing the overall import time compared to local storage. The imported images consisted of only raw images each having a size of 60 megabytes (MB) and import was performed on batch sizes that ranged from 100 images to 1,500 images. As can be seen, the MDP reduced the import time for all raw image batch sizes. The import time was decreased by between 24% and 41% when using the MDP.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

Numerous specific details have been set forth herein to provide a thorough understanding of the embodiments. It will be appreciated, however, that the embodiments may be practiced without these specific details. In other instances, well known operations, components and circuits have not been described in detail so as not to obscure the embodiments. It can be further appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a method for transferring a plurality of image files, the method including initiating at a time $t_n$ a fetch operation on a batch of images, of the plurality of image files, having batch size of $m_F$, wherein the fetch operation is one fetch operation of N fetch operations occurring in parallel with one another; initiating at the time $t_n$ an image processing operation on a batch of images having batch size of $m_P$, of the plurality of image files, wherein the image processing operation is one image processing operation of M image processing operations occurring in parallel with one another; initiating at the time $t_n$ a database update operation $K_D$ on a batch of images having batch size of $m_D$, of the plurality of image files; and using a Markov decision process to determine values of N, M, $m_F$, $m_P$, and $m_D$ for time $t_n$ that results in a higher reward compared to a previous time $t_{n-1}$, wherein the higher reward is associated with a lower transfer time for the plurality of image files.

Example 2 includes the subject matter of Example 1, wherein each of the batch sizes $m_F$, $m_P$, and $m_D$ are less than a predetermined maximum batch size $B_F$, $B_P$, and $B_D$, respectively.

Example 3 includes the subject matter of Example 2, wherein each of the predetermined maximum batch sizes $B_F$, $B_P$, and $B_D$ are determined using a Monte Carlo analysis.

Example 4 includes the subject matter of any one of Examples 1-3, wherein a given stage represents one or more of the N fetch operations, one or more of the M image processing operations, or the database update operation $K_D$, and the method further includes determining a reward value including: incrementing the reward value by a first amount when an average processing time of the given stage at time $t_n$ is less than the average processing time of the given stage at time $t_{n-1}$; incrementing the reward value by a second amount when an average transfer time at time $t_n$ is less than the average transfer time at time $t_{n-1}$; incrementing the reward value by a third amount when the average processing time of the given stage at time $t_n$ is less than a global minimum of the average processing time of the given stage at time $t_n$; and incrementing the reward value by a fourth amount when the average transfer time at time $t_n$ is less than a global minimum of the average transfer time at time $t_n$.

Example 5 includes the subject matter of Example 4, wherein the first amount is equal to the second amount.

Example 6 includes the subject matter of Example 4 or 5, wherein the third amount is greater than the first amount and the second amount, and the fourth amount is greater than the third amount.

Example 7 includes the subject matter of any one of Examples 1-6, wherein initiating the image processing operation comprises extracting metadata from the batch of images having batch size of $m_P$.

Example 8 includes the subject matter of any one of Examples 1-7, wherein initiating the database update operation comprises writing the batch of images having batch size of $m_D$ to a persistent filesystem.

Example 9 includes the subject matter of any one of Examples 1-8, wherein each fetch operation of the N fetch operations includes a uniquely assigned image batch size.

Example 10 includes the subject matter of any one of Examples 1-9, wherein each image processing operation of the M image processing operations includes a uniquely assigned image batch size.

Example 11 is a system configured to import or export a plurality of image files. The system includes at least one processor, and a storage medium operatively coupled to the at least one processor and configured to store instructions that when executed by the at least one processor cause the at least one processor to perform operations to import or export the plurality of image files. The operations include initiating at a time $t_n$ a fetch operation on a batch of images having batch size of $m_F$, of the plurality of image files, wherein the fetch operation is one fetch operation of N fetch operations occurring in parallel with one another; initiating at the time $t_n$ an image processing operation on a batch of images having batch size of $m_P$, of the plurality of image files, wherein the image processing operation is one image processing operation of M image processing operations occurring in parallel with one another; initiating at the time $t_n$ a database update operation $K_D$ on a batch of images having batch size of $m_D$, of the plurality of image files; and using a Markov decision process to determine values of N, M, $m_F$, $m_P$, and $m_D$ for time $t_n$ that results in a higher reward compared to a previous time $t_{n-1}$, wherein the higher reward is associated with a lower import or export time for the plurality of image files.

Example 12 includes the subject matter of Example 11, wherein each of the batch sizes $m_F$, $m_P$, and $m_D$ are less than a predetermined maximum batch size $B_F$, $B_P$, and $B_D$, respectively.

Example 13 includes the subject matter of Example 12, wherein each of the predetermined maximum batch sizes $B_F$, $B_P$, and $B_D$ are determined using a Monte Carlo analysis.

Example 14 includes the subject matter of any one of Examples 11-13, wherein a given stage represents one or more of the N fetch operations, one or more of the M image processing operations, or the database update operation $K_D$, and the operations further include determining a reward value including: incrementing the reward value by a first amount when an average processing time of the given stage at time $t_n$ is less than the average processing time of the given stage at time $t_{n-1}$; incrementing the reward value by a second amount when an average import or export time at time $t_n$ is less than the average import or export time at time $t_{n-1}$; incrementing the reward value by a third amount when the average processing time of the given stage at time $t_n$ is less than a global minimum of the average processing time of the given stage at time $t_n$; and incrementing the reward value by a fourth amount when the average import or export time at time $t_n$ is less than a global minimum of the average import or export time at time $t_n$.

Example 15 includes the subject matter of Example 14, wherein the first amount is equal to the second amount.

Example 16 includes the subject matter of Example 14 or 15, wherein the third amount is greater than the first amount and the second amount, and the fourth amount is greater than the third amount.

Example 17 includes the subject matter of any one of Examples 11-16, wherein initiating the image processing operation comprises extracting metadata from the batch of images having batch size of $m_P$.

Example 18 includes the subject matter of any one of Examples 11-17, wherein initiating the database update operation comprises writing the batch of images having batch size of $m_D$ to a persistent filesystem.

Example 19 includes the subject matter of any one of Examples 11-18, wherein each fetch operation of the N fetch operations includes a uniquely assigned image batch size.

Example 20 includes the subject matter of any one of Examples 11-19, wherein each image processing operation of the M image processing operations includes a uniquely assigned image batch size.

Example 21 includes the subject matter of any one of Examples 11-20, wherein the plurality of image files are imported from, or exported to, the storage medium or another storage medium on the system.

Example 22 includes the subject matter of any one of Examples 11-21, wherein the plurality of image files are imported from, or exported to, a networked storage medium.

Example 23 is a computer program product including one or more non-transitory machine-readable media having instructions encoded thereon that when executed by at least one processor causes a process for importing a plurality of image files to be carried out. The process includes initiating at a time $t_n$ a fetch operation on a batch of images having batch size of $m_F$, of the plurality of image files, wherein the fetch operation is one fetch operation of N fetch operations occurring in parallel with one another; initiating at the time $t_n$ an image processing operation on a batch of images having batch size of $m_P$, of the plurality of image files, wherein the image processing operation is one image processing operation of M image processing operations occurring in parallel with one another; initiating at the time $t_n$ a database update operation $K_D$ on a batch of images having batch size of $m_D$, of the plurality of image files; and using a Markov decision process to determine values of N, M, $m_F$, $m_P$, and $m_D$ for time $t_n$ that results in a higher reward compared to a previous time $t_{n-1}$, wherein the higher reward is associated with a lower import time for the plurality of image files.

Example 24 includes the subject matter of Example 23, wherein each of the batch sizes $m_F$, $m_P$, and $m_D$ are less than a predetermined maximum batch size $B_F$, $B_P$, and $B_D$, respectively.

Example 25 includes the subject matter of Example 24, wherein each of the predetermined maximum batch sizes $B_F$, $B_P$, and $B_D$ are determined using a Monte Carlo analysis.

Example 26 includes the subject matter of any one of Examples 23-25, wherein a given stage represents one or more of the N fetch operations, one or more of the M image processing operations, or the database update operation $K_D$, and the process further includes determining a reward value including: incrementing the reward value by a first amount when an average processing time of the given stage at time $t_n$ is less than the average processing time of the given stage at time $t_{n-1}$; incrementing the reward value by a second amount when an average import time at time $t_n$ is less than the average import time at time $t_{n-1}$; incrementing the reward value by a third amount when the average processing time of the given stage at time $t_n$ is less than a global minimum of the average processing time of the given stage at time $t_n$; and incrementing the reward value by a fourth amount when the average import time at time $t_n$ is less than a global minimum of the average import time at time $t_n$.

Example 27 includes the subject matter of Example 26, wherein the first amount is equal to the second amount.

Example 28 includes the subject matter of Example 26 or 27, wherein the third amount is greater than the first amount and the second amount, and the fourth amount is greater than the third amount.

Example 29 includes the subject matter of any one of Examples 23-28, wherein initiating the image processing operation comprises extracting metadata from the batch of images having batch size of $m_P$.

Example 30 includes the subject matter of any one of Examples 23-29, wherein initiating the database update operation comprises writing the batch of images having batch size of $m_D$ to a persistent filesystem.

Example 31 includes the subject matter of any one of Examples 23-30, wherein each fetch operation of the N fetch operations includes a uniquely assigned image batch size.

Example 32 includes the subject matter of any one of Examples 23-31, wherein each image processing operation of the M image processing operations includes a uniquely assigned image batch size.

Example 33 is a method for transferring a plurality of files. The method includes initiating at a time $t_n$ a fetch operation on a batch of files, of the plurality of files, having batch size of $m_F$, wherein the fetch operation is one fetch operation of N fetch operations occurring in parallel with one another; initiating at the time $t_n$ a file processing operation on a batch of files, of the plurality of files, having batch size of $m_P$, wherein the file processing operation is one file processing operation of M file processing operations occurring in parallel with one another; initiating at the time $t_n$ a database update operation $K_D$ on a batch of files, of the plurality of files, having batch size of $m_D$; and using a Markov decision process to determine values of N, M, $m_F$, $m_P$, and $m_D$ for time $t_n$ that results in a higher reward compared to a previous time $t_{n-1}$, wherein the higher reward is associated with a lower transfer time for the plurality of files.

Example 34 includes the subject matter of Example 33, wherein each of the batch sizes $m_F$, $m_P$, and $m_D$ are less than a predetermined maximum batch size $B_F$, $B_P$, and $B_D$, respectively.

Example 35 includes the subject matter of Example 34, wherein each of the predetermined maximum batch sizes $B_F$, $B_P$, and $B_D$ are determined using a Monte Carlo analysis.

Example 36 includes the subject matter of any one of Examples 33-35, wherein a given stage represents one or more of the N fetch operations, one or more of the M image processing operations, or the database update operation $K_D$, and the method further includes determining a reward value including: incrementing the reward value by a first amount when an average processing time of the given stage at time $t_n$ is less than the average processing time of the given stage at time $t_{n-1}$; incrementing the reward value by a second amount when an average transfer time at time $t_n$ is less than the average transfer time at time $t_{n-1}$; incrementing the reward value by a third amount when the average processing time of the given stage at time $t_n$ is less than a global minimum of the average processing time of the given stage at time $t_n$; and incrementing the reward value by a fourth amount when the average transfer time at time $t_n$ is less than a global minimum of the average transfer time at time $t_n$.

Example 37 includes the subject matter of Example 36, wherein the first amount is equal to the second amount.

Example 38 includes the subject matter of Example 36 or 37, wherein the third amount is greater than the first amount and the second amount, and the fourth amount is greater than the third amount.

Example 39 includes the subject matter of any one of Examples 33-38, wherein initiating the image processing operation comprises extracting metadata from the batch of files having batch size of $m_P$.

Example 40 includes the subject matter of any one of Examples 33-39, wherein initiating the database update operation comprises writing the batch of files having batch size of $m_D$ to a persistent filesystem.

Example 41 includes the subject matter of any one of Examples 33-40, wherein each fetch operation of the N fetch operations includes a uniquely assigned file batch size.

Example 42 includes the subject matter of any one of Examples 33-41, wherein each image processing operation of the M image processing operations includes a uniquely assigned file batch size.

Example 43 is a computer program product including one or more non-transitory machine-readable mediums having instructions encoded thereon that when executed by at least one processor causes a process for importing a plurality of files to be carried out, the process comprising the method of any of one of examples 33-42.

Example 44 is a system including the computer program product of example 43.

Example 45 is a system configured to carry out the method of any of one of examples 33-42.

What is claimed is:

1. A method for transferring a plurality of image files, the method comprising:
    initiating a fetch operation on a batch of images having batch size of $m_F$, of the plurality of image files, wherein the fetch operation is one fetch operation of N fetch operations occurring in parallel with one another;
    initiating an image processing operation on a batch of images having batch size of $m_P$, of the plurality of image files, wherein the image processing operation is one image processing operation of M image processing operations occurring in parallel with one another;
    initiating a database update operation $K_D$ on a batch of images having batch size of $m_D$, of the plurality of image files, wherein the fetch operation, the image processing operation, and the database update operation execute concurrently;
    while the fetch operation, the image processing operation, and the database update operation are executing concurrently, using a Markov decision process to determine updated values of N, M, $m_F$, $m_P$, and $m_D$ at a time $t_n$, wherein executing the fetch operation, the image processing operation, and the database update operation using the updated values results in a higher reward compared to a previous time $t_{n-1}$, wherein the higher reward is associated with a lower transfer time for the plurality of image files compared to the previous time $t_{n-1}$ and a lower average processing time for the image processing operation and the database update operation compared to the previous time $t_{n-1}$; and
    concurrently executing the fetch operation, the image processing operation, and the database update operation using the updated values at a later time $t_{n+1}$.

2. The method of claim 1, wherein each of the batch sizes $m_F$, $m_P$, and $m_D$ are less than a predetermined maximum batch size $B_F$, $B_P$, and $B_D$, respectively.

3. The method of claim 2, wherein each of the predetermined maximum batch sizes $B_F$, $B_P$, and $B_D$ are determined using a Monte Carlo analysis.

4. The method of claim 1, wherein a given stage represents one or more of the N fetch operations, one or more of the M image processing operations, or the database update operation $K_D$, and the method further comprising determining a reward value comprising:
   incrementing the reward value by a first amount when an average processing time of the given stage at time $t_n$ is less than the average processing time of the given stage at time $t_{n-1}$;
   incrementing the reward value by a second amount when an average transfer time at time $t_n$ is less than the average transfer time at time $t_{n-1}$;
   incrementing the reward value by a third amount when the average processing time of the given stage at time $t_n$ is less than a global minimum of the average processing time of the given stage at time $t_n$; and
   incrementing the reward value by a fourth amount when the average transfer time at time $t_n$ is less than a global minimum of the average transfer time at time $t_n$.

5. The method of claim 4, wherein the first amount is equal to the second amount.

6. The method of claim 4, wherein the third amount is greater than the first amount and the second amount, and the fourth amount is greater than the third amount.

7. The method of claim 1, wherein initiating the image processing operation comprises extracting metadata from the batch of images having batch size of $m_P$.

8. A system configured to import or export a plurality of image files, the system comprising:
   at least one processor; and
   a storage medium operatively coupled to the at least one processor and configured to store instructions that when executed by the at least one processor cause the at least one processor to perform operations to import or export the plurality of image files, the operations comprising
   initiating a fetch operation on a batch of images having batch size of $m_F$, of the plurality of image files, wherein the fetch operation is one fetch operation of N fetch operations occurring in parallel with one another;
   initiating an image processing operation on a batch of images having batch size of $m_P$, of the plurality of image files, wherein the image processing operation is one image processing operation of M image processing operations occurring in parallel with one another;
   initiating a database update operation $K_D$ on a batch of images having batch size of $m_D$, of the plurality of image files, wherein the fetch operation, the image processing operation, and the database update operation execute concurrently;
   while the fetch operation, the image processing operation, and the database update operation are executing concurrently, using a Markov decision process to determine updated values of N, M, $m_F$, $m_P$, and $m_D$ at a time $t_n$, wherein executing the fetch operation, the image processing operation, and the database update operation using the updated values results in a higher reward compared to a previous time $t_{n-1}$, wherein the higher reward is associated with a lower import or export time for the plurality of image files compared to the previous time $t_{n-1}$ and a lower average processing time for the image processing operation and the database update operation compared to the previous time $t_{n-1}$; and
   concurrently executing the fetch operation, the image processing operation, and the database update operation using the updated values at a later time $t_{n+1}$.

9. The system of claim 8, wherein each of the batch sizes $m_F$, $m_P$, and $m_D$ are less than a predetermined maximum batch size $B_F$, $B_P$, and $B_D$, respectively.

10. The system of claim 8, wherein a given stage represents one or more of the N fetch operations, one or more of the M image processing operations, or the database update operation $K_D$, and the operations further comprise determining a reward value comprising:
   incrementing the reward value by a first amount when an average processing time of the given stage at time $t_n$ is less than the average processing time of the given stage at time $t_{n-1}$;
   incrementing the reward value by a second amount when an average import or export time at time $t_n$ is less than the average import or export time at time $t_{n-1}$;
   incrementing the reward value by a third amount when the average processing time of the given stage at time $t_n$ is less than a global minimum of the average processing time of the given stage at time $t_n$; and
   incrementing the reward value by a fourth amount when the average import or export time at time $t_n$ is less than a global minimum of the average import or export time at time $t_n$.

11. The system of claim 10, wherein the first amount is equal to the second amount.

12. The system of claim 10, wherein the third amount is greater than the first amount and the second amount, and the fourth amount is greater than the third amount.

13. The system of claim 8, wherein initiating the image processing operation comprises extracting metadata from the batch of images having batch size of $m_P$.

14. The system of claim 8, wherein initiating the database update operation comprises writing the batch of images having batch size of $m_D$ to a persistent filesystem.

15. A computer program product including one or more non-transitory machine-readable media having instructions encoded thereon that when executed by at least one processor causes a process for importing a plurality of image files to be carried out, the process comprising:
   initiating a fetch operation on a batch of images having batch size of $m_F$, of the plurality of image files, wherein the fetch operation is one fetch operation of N fetch operations occurring in parallel with one another;
   initiating an image processing operation on a batch of images having batch size of $m_P$, of the plurality of image files, wherein the image processing operation is one image processing operation of M image processing operations occurring in parallel with one another;
   initiating a database update operation $K_D$ on a batch of images having batch size of $m_D$, of the plurality of image files, wherein the fetch operation, the image processing operation, and the database update operation execute concurrently;
   while the fetch operation, the image processing operation, and the database update operation are executing concurrently, using a Markov decision process to determine updated values of N, M, $m_F$, $m_P$, and $m_D$ at a time $t_n$, wherein executing the fetch operation, the image processing operation, and the database update operation using the updated values results in a higher reward compared to a previous time $t_{n-1}$, wherein the higher reward is associated with a lower import time for the plurality of image files compared to the previous time $t_{n-1}$ and a lower average processing time for the image processing operation and the database update operation compared to the previous time $t_{n-1}$; and concurrently executing the fetch operation, the image processing operation, and the database update operation using the updated values at a later time $t_{n+1}$.

16. The computer program product of claim 15, wherein each of the batch sizes $m_F$, $m_P$, and $m_D$ are less than a predetermined maximum batch size $B_F$, $B_P$, and $B_D$, respectively.

17. The computer program product of claim 15, wherein a given stage represents one or more of the N fetch operations, one or more of the M image processing operations, or the database update operation $K_D$, and the process further comprises determining a reward value comprising:

incrementing the reward value by a first amount when an average processing time of the given stage at time $t_n$ is less than the average processing time of the given stage at time $t_{n-1}$;

incrementing the reward value by a second amount when an average import time at time $t_n$ is less than the average import time at time $t_{n-1}$;

incrementing the reward value by a third amount when the average processing time of the given stage at time $t_n$ is less than a global minimum of the average processing time of the given stage at time $t_n$; and incrementing the reward value by a fourth amount when the average import time at time $t_n$ is less than a global minimum of the average import time at time $t_n$.

18. The computer program product of claim 17, wherein the first amount is equal to the second amount.

19. The computer program product of claim 17, wherein the third amount is greater than the first amount and the second amount, and the fourth amount is greater than the third amount.

20. The computer program product of claim 15, wherein initiating the image processing operation comprises extracting metadata from the batch of images having batch size of $m_P$.

* * * * *